Oct. 13, 1931.  E. G. STAUDE  1,827,117
HYDRAULIC STEERING MECHANISM FOR POWER PROPELLED VEHICLES
Filed May 16, 1925   5 Sheets-Sheet 1

INVENTOR
EDWIN G STAUDE
BY
ATTORNEYS

Oct. 13, 1931.  E. G. STAUDE  1,827,117
HYDRAULIC STEERING MECHANISM FOR POWER PROPELLED VEHICLES
Filed May 16, 1925   5 Sheets-Sheet 2

INVENTOR
EDWIN G STAUDE
BY Paul, Paul & Moore
ATTORNEYS

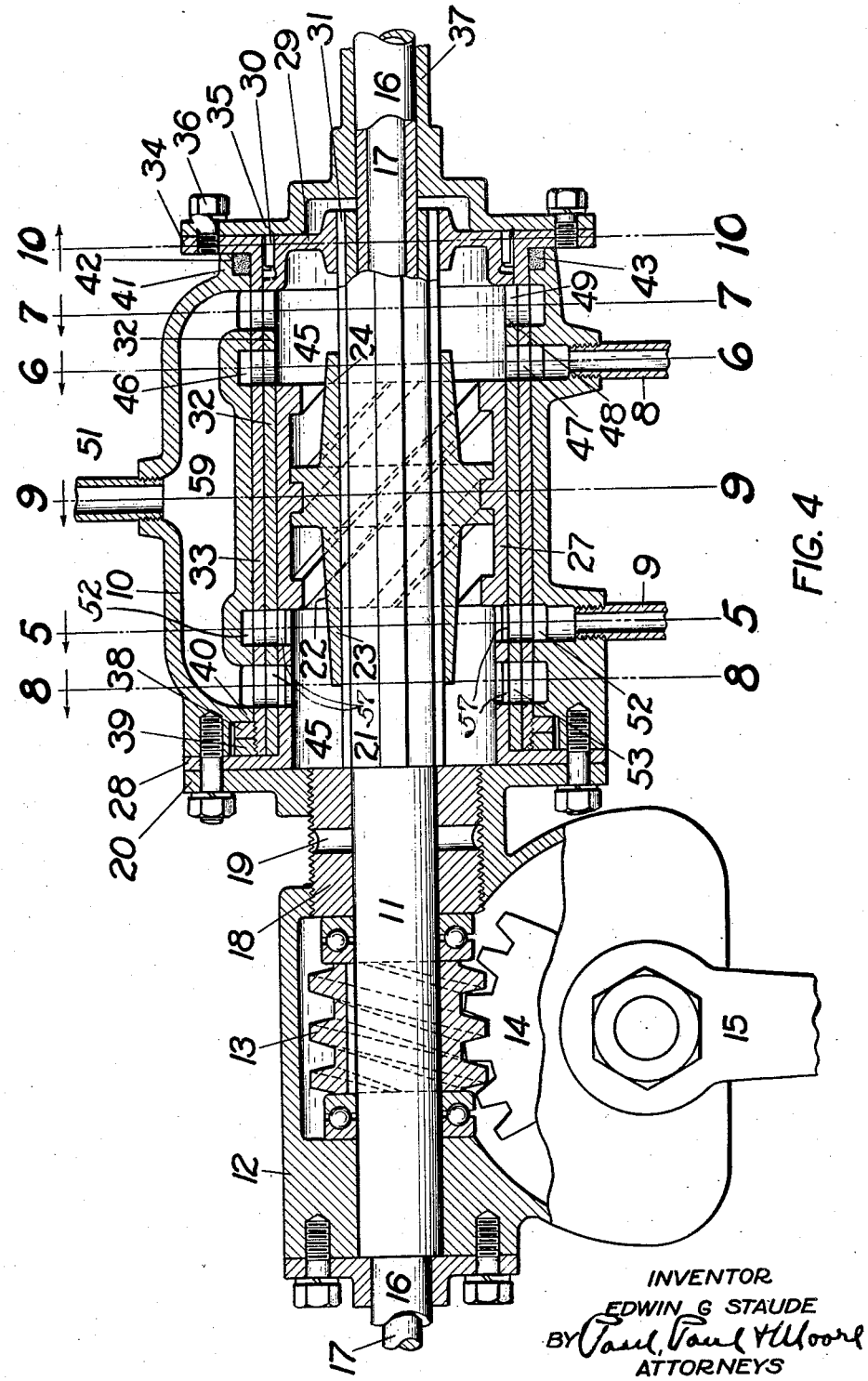

Oct. 13, 1931. E. G. STAUDE 1,827,117
HYDRAULIC STEERING MECHANISM FOR POWER PROPELLED VEHICLES
Filed May 16, 1925 5 Sheets-Sheet 4

INVENTOR
EDWIN G. STAUDE
BY Paul, Paul & Moore
ATTORNEYS

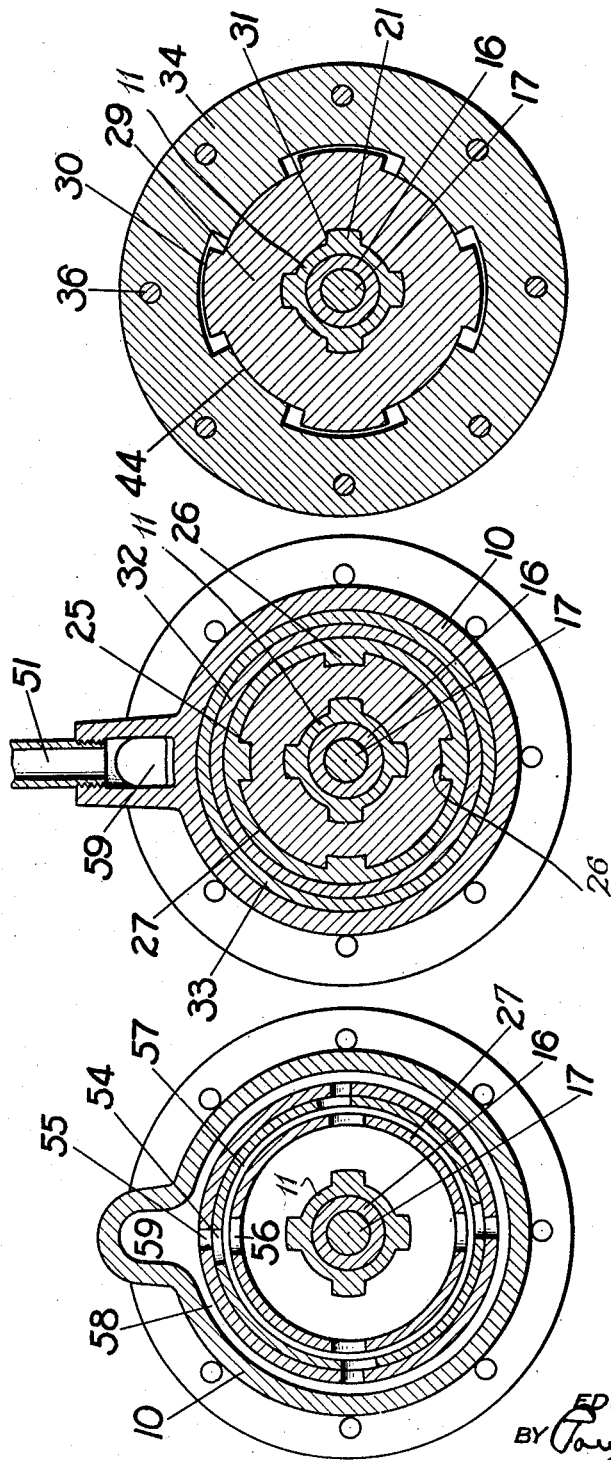

Patented Oct. 13, 1931

1,827,117

UNITED STATES PATENT OFFICE

EDWIN G. STAUDE, OF MINNEAPOLIS, MINNESOTA

HYDRAULIC STEERING MECHANISM FOR POWER PROPELLED VEHICLES

Application filed May 16, 1925. Serial No. 30,883.

In the operation of power propelled vehicles, particularly heavy trucks, busses and vehicles of similar class and nature, the ordinary manually operated steering mechanism is frequently difficult to manipulate, owing to the weight of the vehicle, and in order that the driver may steer same, a considerable gear reduction is required, which is a great drawback when quick action is required.

The object of my invention is to provide a hydraulic steering mechanism which shall be under the positive control of the driver at all times.

A further object is to provide a hydraulic steering mechanism which will operate normally without the aid of the hydraulic mechanism in event same becomes inoperative for any reason.

A further object is to provide a hydraulic steering mechanism which normally will do all the work of operating the steering post, the driver simply controlling the telescoping valves, whereby the mechanism is regulated.

A further object is to provide a hydraulic steering mechanism which shall be quick acting and respond immediately to the slightest movement of the steering wheel.

A further object is to provide a hydraulic steering mechanism which may be economically manufactured and applied to present day motor vehicles;

The invention consists generally in various constructions and combinations, all as hereinafter described and particularly pointed out in the claims.

In the accompanying drawings forming a part of this specification,

Figure 4 is a longitudinal section of a steering post embodying my invention;

Figure 8 is a section on the line 8—8 of Figure 4, looking in the direction of the arrow;

Figure 9 is a section on the line 9—9 of Figure 4, looking in the direction of the arrow;

Figure 10 is a section on the line 10—10 of Figure 4, looking in the direction of the arrow.

Figure 1:
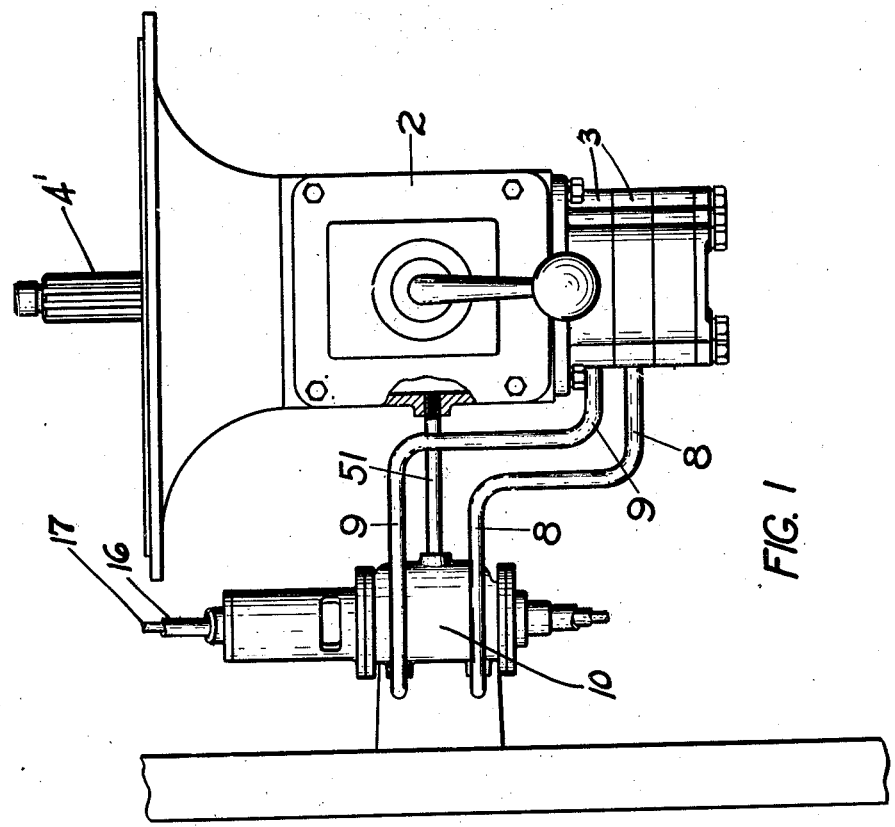
Figure 1 is a diagrammatic plan view of a part of a motor car transmission, section of the frame, and section of the steering post to which my invention is adapted, the parts being shown in one plane, for purposes of convenience.
Figure 2:
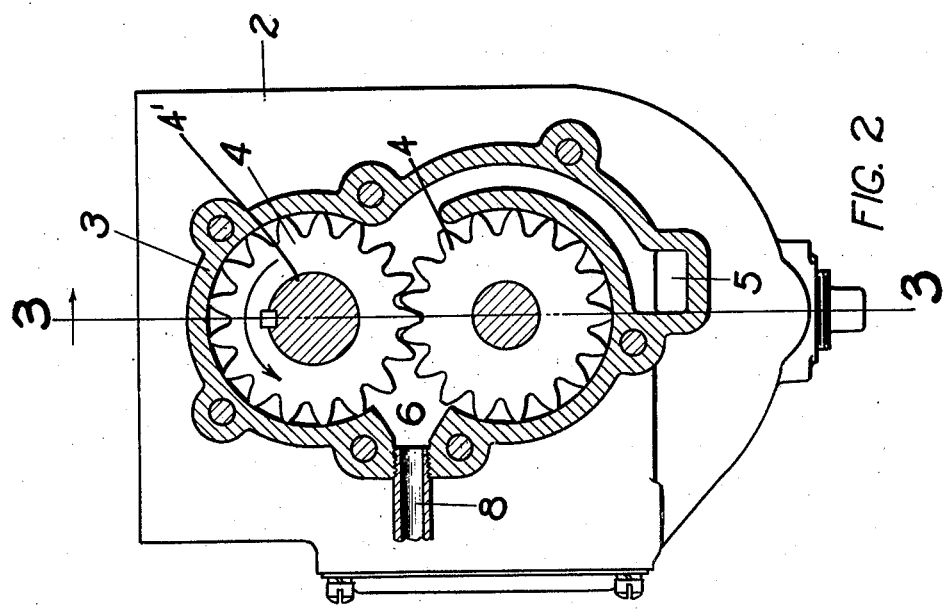
Figure 2 is a rear end view of a motor car transmission, showing one of the pair of circulating pumps in section, the section being on the line 2—2 of Figure 3, looking in the direction of the arrow.
Figure 3:
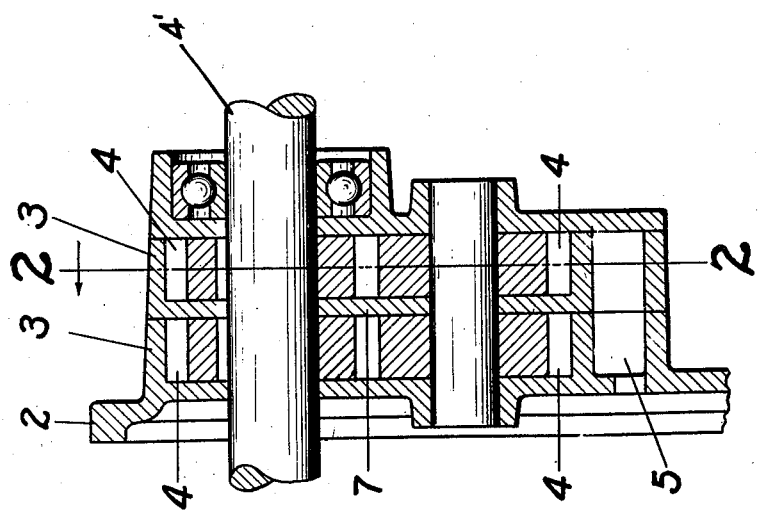
Figure 3 is a section on the line 3—3 of Figure 2, looking in the direction of the arrow.

In the drawings I have illustrated a preferable construction in which 2 represents the rear of an ordinary motor car transmission, (see Figures 1, 2 and 3).

At the rear of the transmission I provide a pair of suitable housings 3 for a pair of ordinary gear pumps 4, the upper gear of which is mounted on the transmission shaft 4' and during the forward movement of the motor vehicle will operate counter-clockwise, as indicated by the arrow on the gear 4 in Figure 2.

Each of these gear pumps has an intake 5, communicating with the fluid in the transmission case, and as the gear revolves, a pressure is built up at the point 6 of both pumps, each of which is separated from the other by the wall 7, and each of which has an outlet 8 and 9 through which the fluid is forced to circulate by pipes to the casing 10 of the hydraulic steering mechanism on the steering post 11.

The steering post 11 is of a conventional type in that it has the usual casting 12, within which is mounted a worm gear 13, cooperating with a sector gear 14, and a drop arm 15 which is connected to the ordinary spindle connecting rod in the usual manner.

The steering post 11 is hollow, as usual, to receive the gas controlling mechanism 16 and the spark mechanism control 17.

The usual thrust adjustment may be had by the threaded collar 18 that is adjusted through holes 19 in the collar and the collar kept in position by the usual clamp arrangement, not shown.

The end of the casting 12 is provided with a flange 20 to which the casing 10 of the hydraulic steering mechanism is bolted.

The worm gear 13 is keyed to the hollow steering post 11 in the usual manner.

The steering post 11 is at one portion provided with a splined outside surface 21 at its upper end and is adapted to receive a movable piston 22 having long bearings 23 and 24. The sleeve as herein shown is short but may be of any preferred length. The outer face of the piston 22 has four spiral grooves 25 cut into it and adapted to receive the spirals 26 on the sleeve 27. The sleeve 27 has a flange 28 which is bolted against rotation to the flange 20, (see Figure 4). The piston may thus be designated as having a spiral splined connection with the sleeve 27.

From this construction just described it follows that as the piston moves towards the worm steering mechanism it will be revolved by its contact with the spiral threads 26, and being splined to the steering post 11, it follows that the steering post must turn with the piston. As the piston travels in the opposite direction, the direction of movement will, of course, be reversed.

On the upper end of the splined steering post 11 I provide a disc 29 having splines 30 on its outer surface and splines 31 in the center, the splines 31 cooperating with the splines 21 on the hollow steering post, so as to secure the disc 29 against rotation except with the steering post 11.

Formed integral with the disc 29 is a sleeve 32 which fits over the sleeve 27. A similar sleeve 33 is mounted over the sleeve 32, the sleeve 33 having a flange 34 which is bolted to the coupling 35 by bolts 36, the coupling 35 being a part of the steering post 37 to which the usual steering wheel is attached, (see Figure 4).

The sleeve 33 also fits in the casting 10 and is held in place by a pair of jam nuts 38 and 39 which bear against a shoulder 40 of the casting 10. The opposite end of the sleeve 33, having the flange 34, bears against a shoulder 41 on the casting 10 and has a recess 42 to receive a packing ring 43, to prevent the fluid from escaping when under pressure at this point. The sleeve 33 has suitable splines 44 fastened on its inside to cooperate with the splines 30 on the disc 29, (see Figure 10).

These splines or jaw clutches are adapted to have some radial movement with respect to each other. That is to say, as the handwheel is turned, it in turn moves the flange 34 and this must travel through a radius of one or two degrees before the lugs on splines 44 come in contact with similar lugs on splines 30 on the disc 29.

As hereinbefore stated the fluid from the pump 4 passes out through the outlet 6 through tubes 8 and 9.

Figure 6:
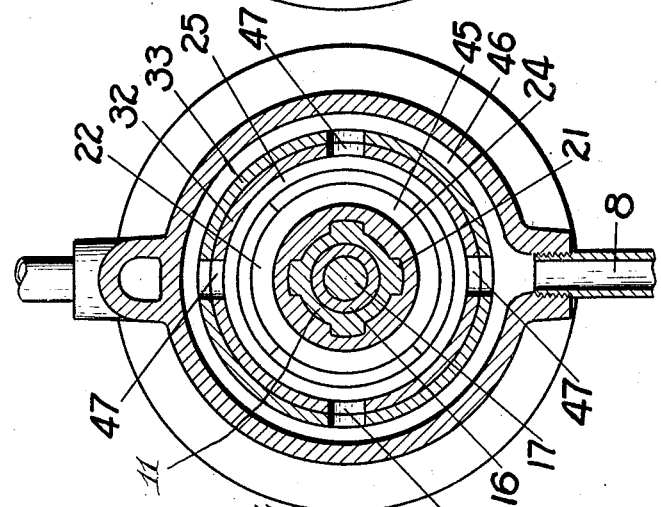
Figure 6 is a section on the line 6—6 of Figure 4, looking in the direction of the arrow.

The fluid coming into the chamber 45, where it is in contact with either side of the piston 22, first flows around an annular groove 46 in the casting 10 and around the outside of the sleeve 33, (see Figure 6). Liquid under pressure flows through all of the ports 47, see Figures 4 and 6, and must travel around the passage 46. The liquid must be, and in the working device is, distributed by the passage 46 to all the ports 47. When the parts are in the position shown in Figure 4 and upon introduction of oil, the oil fills all the passages and passes through all the ports and through the chambers 45 into the chamber 59.

The sleeves 33 and 32 have slotted openings 47 through which the fluid passes from the annular groove 46 into the chamber 45.

The fluid entering the chamber 45 will flow against the piston 22, but since other openings 48 in the sleeve 32 and 49 in the sleeve 33 supply an outlet into the annular groove 52 and from there through the tube 51, which communicates with the transmission case, there can be no pressure set up to move the piston.

Figure 5:
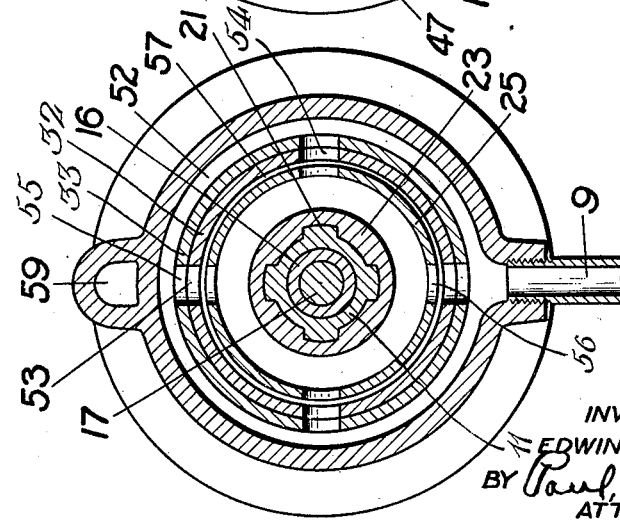
Figure 5 is a section on the line 5—5 of Figure 4, looking in the direction of the arrow.

Since there is also a circulation through the tube 9 (see Figure 5) and through a similar groove 52, corresponding to the groove 46, and similar slots 53 corresponding to the slots 47, it follows that this pressure, whatever it may be, will equalize the pressure on the opposite side, especially since the outlet is similar to the one just described, being slots 54 in the sleeve 32, and 55 in the sleeve 33.

Slots 56 are in the sleeve 27 and an annular groove 57 is provided, so that the flow of the fluid may not be retarded.

As the fluid comes through the slot 55 it enters the groove 58, which corresponds to the groove 50 on the opposite side and connects with the outlet tube 51 by the passage 59.

As soon as the vehicle is under motion both of the pumps 4 will start circulating fluid through the tubes 8 and 9. The liquid from the tube 8 passes into the channel 46 through ports 48—49 into space 45, from space 45 through ports 48—49 into channel 50, thence through chamber 59 to return pipe 51. The liquid passing through the tube 9 enters channel 52, passes through ports 55, 54, 56 into the space 45, thence through ports 56, 54, 55 into channel 58, thence to chamber 59 and return pipe 51. It will be noted that both channels 46 and 58 communicate with tube 51 through chamber 59 and also that both channels 52—58 communicate with the tube 51 through the chamber 59. The pressure being equal on both sides of the piston 22, the hydraulic feature does not function.

Directly, however, that the steering wheel is turned counter-clockwise, it will revolve the steering post 37 and through the flange 35 it will revolve the flange 34 that is formed on the sleeve 33.

Figure 7:
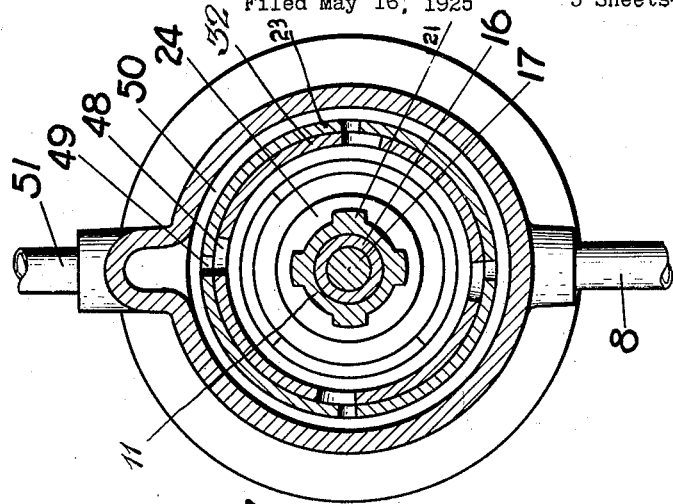
Figure 7 is a section on the line 7—7 of Figure 4, looking in the direction of the arrow.

Looking now to Figure 7, the port 49 will be closed from the port 48 and the outlet of the fluid from the chamber 45 will be immediately checked, and since the fluid is not compressible, a pressure against the piston 22 will immediately be exerted and cause the piston to move on the splines 21, and because of its spiral contact with the sleeve 27 it will serve to turn the steering post 11.

Since the steering post 11 carries the disc 29, which is secured to the sleeve 32, it follows that as the sleeve 32 follows up it will again open the port 49 with the port 48 and relieve the pressure causing the piston to stop in its movement. If the steering wheel is again moved to close the port 49 from the port 48, the pressure will again immediately build up and the cycle of movement be the same as before.

If the driver holds the wheel against the stops 30 and 44, the piston will, of course, make its maximum travel. Directly the wheel is turned in the opposite direction the reverse action occurs with the ports 54 and 55, (see Figure 8).

Since the circulating pressure is at all times on opposite sides of piston 22, it follows that these pressures will build and move the piston 32 until the balance is reached, which will substantially leave the lugs 30 and 44 (see Figure 10) in the position shown with play or lost motion on each side of the lug 30.

Should, however, for any reason the circulation of the fluid be impaired or should the transmission case become empty, then the lugs 30 will come in contact with the lugs 44 as the driver turns the wheel, and the steering may then be continued manually without the aid of the hydraulic device, except, of course, it will require extra exertion on the part of the driver.

This feature is very important, in that the steering mechanism may be made operative independently of the hydraulic mechanism should the latter become disabled.

I do not necessarily consider the matter of two pumps and two separate fluid circuits as essential, although they are doubtless the most positive and therefore practical.

I do not wish to adhere to the specific construction shown, since various mechanical arrangements may be devised by anyone skilled in the art, all of which would serve to answer the same purpose without departing from the invention.

I provide compression spring pressed abutments 60, see Figure 10, on each side of the splines 30 on the disc 29 to bear against the splines 44 on the sleeve 33 to act as or have the function of a cushion.

I claim as my invention:

1. A hydraulic steering mechanism for motor vehicles comprising a steering post, a reciprocating piston splined to said post and having a sliding movement and provided with spiral grooves on its periphery, a sleeve having internal threads adapted to cooperate with said spiral grooves, a pair of circulating pumps each having a fluid circulating system and adapted to cause a pressure on the exhaust side of said pump and actuate the aforesaid piston, and a valve adapted to check the flow of fluid on one side or the other of said piston.

2. A hydraulic steering mechanism for motor vehicles comprising a steering post, reciprocating piston controlling means mounted on and having a spiral splined connection with said steering post, a pump having a circulating system for generating pressure to actuate said piston controlling means, and valves supporting the piston adapted to control said pressure.

3. A hydraulic steering mechanism for motor vehicles comprising a steering post, means attached to and adapted for controlling the movement of said post, a transmission shaft, a pair of pumps mounted on said transmission shaft and driven by the motion of said shaft, a circulating system for the pumps adapted to deliver fluid to said steering shaft controlling means and telescope valves for checking the flow of either fluid circuit.

4. A hydraulic steering mechanism for motor vehicles comprising a steering post, a transmission shaft and case, means for controlling the direction of rotation of said steering post, a pair of pumps mounted on said transmission shaft and driven by the motion of said shaft, the intake of said pumps adapted to communicate with the fluid in said transmission case, a fluid circuit for the pumps from the pumps to the steering post controlling means, including a return from said steering post controlling means to said transmission case, and valves for controlling the flow of fluid in each of said circuits for the purpose specified.

5. A hydraulic steering mechanism for motor vehicles comprising a steering post adapted to be manually operated, piston means on said post reciprocable for aiding such manual operation, means adapted to create a fluid pressure for actuating said means, and a pair of sleeve valves surrounding said piston means, said valves connected for rotation by said steering post, one in advance of the other.

6. A casing having receiving and discharge ports, a steering post traversing the casing, a valve sleeve rotatable in said casing and connected for rotation by a steering post, a second valve sleeve within and connected with the first for lagging rotation thereby, a second portion of the steering post, as a sleeve, journaled in said casing, a piston having splined connection with said steering post sleeve, a third and innermost sleeve nonrotatably secured to the casing, and having internal threads cooperating with said piston, said valve sleeves having ports registerable with the casing ports.

7. A casing having circumferential sets of intake and outlet ports, a pair of valve sleeves rotatable one by the other within said casing, and having intercommunicating ports in sets adjacent each end registerable with one another and with corresponding intake and outlet ports of the casing, a steering post traversing the casing, a sleeve as a part of the steering post, traversing the inner valve sleeve and transmittibly connected with a steering arm, a piston splined to said valve sleeve for translation between the ports, a non-rotatable sleeve encircling said piston, and interconnected therewith to cause the piston to rotate when said piston is translated.

8. A structure including a hollow portion, a first steering post section, a piston splined to the steering post section, and spirally splined to a wall of the hollow portion, to divide it into two chambers, a second steering post section, and valves movable with the steering post sections and cooperable for controlling the flow through the chambers, and means for obtaining a pressure circulation of fluid on both sides of said piston.

9. A structure including a hollow portion, a first steering post section, a piston splined to the steering post section, and spirally splined to a wall of the hollow portion, to divide it into two chambers, a second steering post section, valves one for and movable by each steering post section and cooperable for controlling the flow through the chambers, and means for obtaining a pressure circulation of fluid on both sides of said piston.

10. A structure including a hollow portion, a first steering post section, a piston splined to the steering post section, and spirally splined to a wall of the hollow portion, to divide it into two chambers, a second steering post section, valves movable with the steering post sections and cooperable for controlling the flow through the chambers and means for obtaining a pressure circulation of fluid on both sides of said piston, said valves being arranged so that each can move independently of the other through a predetermined distance, and being provided with abutments which will engage after such predetermined rotation.

11. A hollow structure, a first steering post section, a piston having a splined connection with the steering post section, and having a spirally splined connection with said structure in a manner to divide it into two chambers, said first steering post section having a sleeve valve, a second steering post section having a sleeve valve cooperable with the first valve, for alternately controlling flow at opposite sides of said piston, and means for circulating fluid under pressure through said valves and chambers.

12. A hollow structure, a first steering post section, a piston having a splined connection with the steering post section, and having a spirally splined connection with said structure in a manner to divide it into two chambers, said first steering post section having a sleeve valve, a second steering post section having a sleeve valve cooperable with the first valve, for alternately controlling flow at opposite sides of said piston and means for circulating fluid under pressure simultaneously through said valves at both sides of said piston.

13. A structure including a hollow portion, a first steering post section, a piston splined to the steering post section, and spirally splined to a wall of the hollow portion, to divide it into two chambers, a second steering post section and valves movable with the steering post sections and cooperable for controlling the flow through the chambers, and means for obtaining a pressure circulation of fluid on both sides of said piston, the valves being so constructed that when the last mentioned steering post section is rotated in one direction, a pressure is created to translate the piston in one direction, and when said post extension is rotated in the opposite direction a pressure is created to translate the piston in an opposite direction.

14. A hollow structure, a first steering post section, a piston splined to said post and spirally splined to the inner wall of said hollow structure to divide the same into two chambers, said piston being capable of reciprocation, a valve movable with said post, a second steering post section having a valve movable therewith and cooperable with the said first mentioned valve to separately control the flow respectively through those chambers at opposite sides of the piston, and means for obtaining a circulating pressure on both sides of the piston, said valves being so constructed that pressures can be alternately created at opposite sides of said piston conformably to rotation of said second steering post section in opposite directions.

15. A hollow structure, a first steering post section, a piston splined to said post and spirally splined to the inner wall of said hollow structure to divide the same into two chambers, said piston being capable of reciprocation, a valve movable with said post, a second steering post section having a valve movable therewith and cooperable with the said first mentioned valve to separately control the flow respectively through those chambers at opposite sides of the piston, and means including passages in said structure and means for circulating fluid under pressure through said valves and chambers for creating pressure respectively at opposite sides of said piston when said last mentioned steering post section is rotated in opposite directions.

16. A structure including a chamber, a first steering post section, a piston slidable upon the steering post section and arranged to divide the chamber into two parts, said piston being connected to the wall of the chamber in such manner that the piston and therefore the steering post section is rotated whenever the piston is translated, means for obtaining pressure circulation of fluid through both chambers, a second steering post section, and valves movable with the steering post sections and cooperable for controlling the flow through the chambers.

17. A device of the class described comprising a steering post, piston means reciprocable upon the post for controlling its movements, a fluid pressure circulating system for actuating said piston means, a pump for generating fluid pressure in the system, and a sleeve valve for controlling fluid pressure to opposite sides of the piston means.

In witness whereof, I have hereunto set my hand this 14th day of April 1925.

EDWIN G. STAUDE.